May 20, 1952 H. L. McCORMICK 2,597,357
GENERATOR SPEED CONTROL
Original Filed June 20, 1945
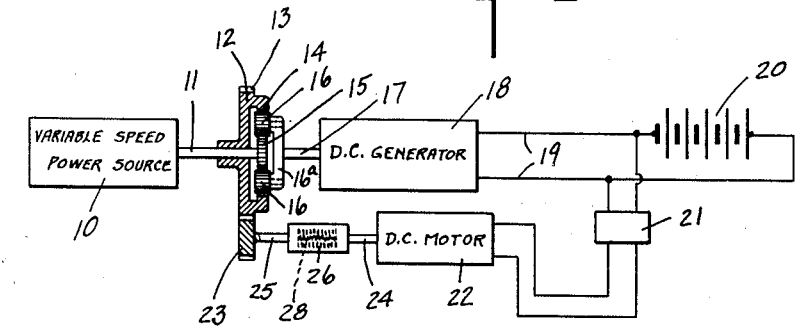
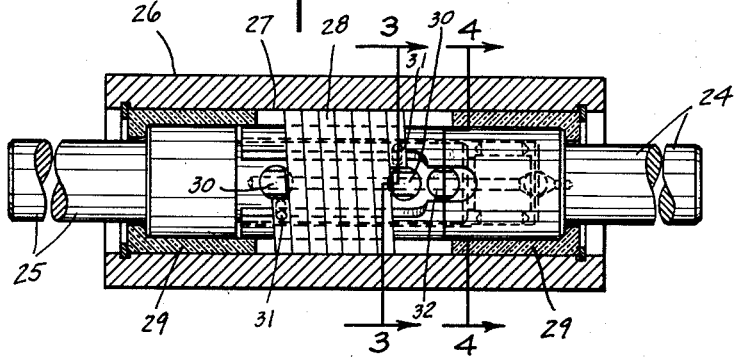
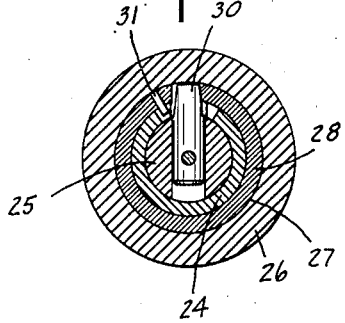 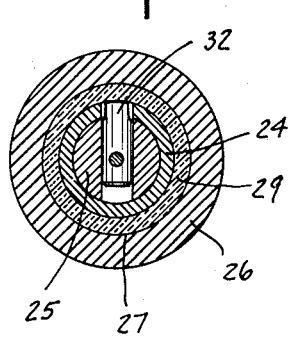
INVENTOR.
HAMILTON L. McCORMICK.
BY
Lockwood, Goldsmith & Galt,
ATTORNEYS.

UNITED STATES PATENT OFFICE 2,597,357

GENERATOR SPEED CONTROL

Hamilton L. McCormick, Carmel, Ind., assignor to Fletcher Trust Company, trustee, Indianapolis, Ind., a corporation Substituted for application Serial No. 600,514, June 20, 1945. This application October 7, 1949, Serial No. 120,109

3 Claims. (Cl. 322—28)

The invention relates to a generator speed control organized to provide a variable drive for a direct current generator to maintain a constant voltage output to supply the desired work load. This application is substituted for my application Serial No. 600,514, filed June 20, 1945, now abandoned.

It is recognized that when direct current generators are driven by a variable speed power source, the voltage generated will vary accordingly. The usual variable resistance types of voltage controls such as are provided to maintain the generated voltage substantially constant or below undesirable values waste considerable energy which has to be dissipated as heat.

The principal object hereof is to control or regulate the input drive speed of the generator in such manner that its output voltage is never materially higher than required by the load and without substantial waste of energy.

That object is accomplished according to the illustrated form of the invention by connecting with the generator output circuit a direct current over-voltage-responsive relay and D. C. motor, which motor is thereby responsive to certain variations in generator output line voltage, such motor then being connected to a variable speed power transmission between the variable speed power source and the generator through a no-back or anti-counterdriving coupling which functions automatically to connect the motor to the transmission under conditions requiring motor operation but prevents the transmission from back-driving the motor.

The full nature of the invention will be understood from the accompanying drawing and the following description and claims:

Fig. 1 is a diagrammatical illustration of the electric circuit and operating parts of the generator and its control.

Fig. 2 is a central vertical sectional view through the no-back coupling with some of the parts in elevation.

Fig. 3 is a section taken on the line 3—3 of Fig. 2.

Fig. 4 is a section taken on the line 4—4 of Fig. 2.

In the drawing there is shown a direct current generator 18 and connected planetary transmission gearing mechanism 2 having a variable speed power source 10 which may be any type of engine such as an internal combustion engine or a diesel engine. The power source 10 drives the shaft 11 which drives the planetary mechanism 1. Said mechanism includes a ring gear 12 having external gear teeth 13 and internal gear teeth 14. The gear 12 is journalled for free rotation about the shaft 11, said shaft has a sun gear 15 fixed thereto in constant mesh with planetary gears 16 which, in turn, constantly mesh with the internal teeth 14 of the ring gear. The planetary gears 16 are revolubly mounted upon a carrier or spider 16a secured to the generator input drive shaft 17. Thus the power source 10 drives the generator 18 through the sun gear and planetary gears, the speed of rotation being controlled by the ring gear as will be described.

The generator 18 is electrically connected through the circuit 19 with the opposite terminals of any work load, herein represented by a battery 20. The circuit 19 is connected through the D. C. over voltage relay 21 with the direct current speed voltage responsive motor 22. The over voltage relay 21 is of the usual character such as to cut in the motor 22 upon excess voltage being generated, and cut out the motor when less than excess voltage is being generated. Thus the motor 22 is driven at a speed in accordance with the over voltage generated by the generator 18 through the circuit 19, the speed of the generator drive, in turn, being controlled by the driven speed of the motor.

The motor 22 drives a pinion 23 through the motor output shaft 24 and connected shaft 25 of a no-back coupling 26. The coupling as previously stated permits the motor 22 to drive the pinion 23, but prevents the pinion 23 from driving the motor. Pinion 23 meshes constantly with the external gear teeth 13 of the ring gear 12.

The no-back coupling, sometimes referred to as an anti-kickback clutch or brake, may be of the type and character disclosed in William Carleton Starkey Patent 2,421,814, issued June 10, 1947. The Starkey device as shown at 26 in Figs. 2, 3 and 4 is a bi-directional no-back direct drive coupling. It needs only to prevent back driving in one direction for the present purpose. The housing of coupling 26 is firmly fixed so as to be non-rotatable, and is formed with an internal circular drum surface 27 against which a helical friction spring 28 is self-locking by reason of being oversize relative to the drum. The rotor or driving shaft 24 of the motor 22 and the shaft 25 of coupling 26, keyed to the pinion 23, are rotatably supported in bearings 29. Motor shaft 24 is formed with an axially slotted sleeve 24a in which a reduced extension of the shaft 25 extends and is piloted. The spring 28 surrounds the sleeve, free therefrom, said shaft 25 having aligned "no-back" pins 30 extending radially therefrom through the sleeve slot into position to abut the opposed ends of the clutch spring 28. The slot of sleeve 24a straddles a pair of radial pins 31 carried by the end portions of the clutch spring and which extend inwardly therefrom into the path of movement of the sleeve 24a. The slot of the sleeve has a right hand end portion of reduced width embracing a driving pin 32 secured to the shaft 25.

Said structure is arranged so that the pins 31 have about a 2° play with respect to the slot of sleeve 24a. The "no-back" pins 30 are arranged to have about a 3° play in respect to the ends of the clutch spring, and the driving pin 32 is arranged to have a 4° play between the walls of the reduced portion of the sleeve slot.

The above arrangement is such that the motor shaft 24 will drive shaft 25 to the pinion 23 through the coupling 26 but the pinion will be locked by the helical spring 28 against driving the shaft 24. When shaft 24 is driven by the motor 22 its sleeve 24a engages one of the pins 31 of the spring upon a 2° rotation in a direction to contract the spring sufficiently to enable it to turn easily in the fixed housing 26 wherefore the shaft 25 can be driven through its pin 32 and the slotted sleeve 24a which receives said pin. The shaft 25, however, will be restrained from driving the shaft 24 since one of the "no-back" pins will abut an associated end of the spring upon a 3° movement to lock the spring into braking engagement with the fixed housing 26 and prevent rotation of shaft 25 wherefore it cannot turn the 4° necessary to bring the driving pin 32 into engagement with the sleeve 24a to drive shaft 24.

By virtue of the coupling 26 or its equivalent, unless the motor 22 becomes driven by current at excess voltage supplied through the relay 21 the pinion 23 will be held against rotation, which in turn holds the ring gear 12 against rotation whereby the generator 18 is normally driven at a certain speed as determined by the design of the gearing but vary with that of the power source. Thus when the power source reaches a predetermined high speed, the voltage generated by generator 18 exceeds the setting of relay 21, and the motor 22 is then energized and driven at a speed corresponding to the voltage supplied to it. Such motor drive is transmitted through the coupling 26 and pinion 23 to the ring gear 12 which will then be driven in the proper direction proportionately to reduce the speed of shaft 17 through the transmission 2. Such reduction in speed of the generator in turn reduces its output voltage with the result that said voltage is regulated so as not to exceed a predetermined value by the balanced control between the voltage generated and the speed of the generator maintained through the motor, coupling and driving connection with the ring gear, all without requiring a resistance type voltage regulator, dissipation of heat thereof and waste of energy.

The invention claimed is:

1. In a generator speed control including a power source, a direct current generator driven thereby subject to variations in speed and a variable speed planetary transmission gearing through which said generator is driven by said power source, said transmission including a gear operable to control the speed at which said generator is driven by said power source, the combination therewith of a direct current torque transmitting motor connected with the voltage output line of said generator, a driving pinion in meshing engagement with said gear and an anti-back-drive coupling arranged to enable the pinion to be driven by said motor while preventing counterdrive of said pinion by said gear.

2. In a generator speed control including a power source, a direct current generator driven thereby subject to variations in speed and a variable speed planetary transmission gearing through which said generator is driven by said power source including a floating ring gear, the combination therewith of a direct current torque transmitting motor connected with the voltage output line of said generator, an over-voltage relay connected in said line, a driving pinion in meshing engagement with teeth of said ring gear and driven by said motor, and means to prevent back-driving of said pinion in one direction by said ring gear.

3. In a generator speed control including a power source, a direct current generator driven thereby subject to variations in speed and a variable speed planetary transmission gearing through which said generator is driven by said power source including a floating ring gear, the combination therewith of a direct current torque transmitting motor connected with the voltage output line of said generator, a voltage relay connected in said line, a driving pinion in meshing engagement with teeth of said ring gear and driven by said motor, and a no-back brake connected with said pinion to permit rotation of said pinion and ring gear while preventing said ring gear from driving said pinion.

HAMILTON L. McCORMICK.

REFERENCES CITED

The following references are of record in the file of this patent:

UNITED STATES PATENTS

| Number | Name | Date |
|---|---|---|
| 935,051 | Parker | Sept. 28, 1909 |
| 1,883,929 | Johnson et al. | Oct. 25, 1932 |
| 2,449,905 | Lotts et al. | Sept. 21, 1948 |

FOREIGN PATENTS

| Number | Country | Date |
|---|---|---|
| 541,105 | Great Britain | Nov. 13, 1941 |